(12) United States Patent
Heindl et al.

(10) Patent No.: US 6,298,939 B1
(45) Date of Patent: Oct. 9, 2001

(54) SYSTEM FOR CONTROLLING THE TRACTION POWER OF A UTILITY VEHICLE

(75) Inventors: Richard Heindl, Marktoberdorf; Gunther Groger, Lengenwang; Theodor Bosl, Marktoberdorf; Robert Honzek, Oberthingau, all of (DE)

(73) Assignee: Agco GmbH (DE)

( * ) Notice: Subject to any disclaimer, the term of this patent is extended or adjusted under 35 U.S.C. 154(b) by 0 days.

(21) Appl. No.: 09/261,794

(22) Filed: Mar. 3, 1999

(30) Foreign Application Priority Data

Mar. 5, 1998 (GB) .................................................. 9804651

(51) Int. Cl.[7] .................................................. B60K 17/00
(52) U.S. Cl. .............................. 180/336; 60/494; 180/307
(58) Field of Search .................................... 180/336, 305, 180/307; 60/487, 494 XC

(56) References Cited

U.S. PATENT DOCUMENTS 5,653,107   8/1997   Beck ...................................... 60/452

FOREIGN PATENT DOCUMENTS

| 19523963 | 1/1997 | (DE) . | |
|---|---|---|---|
| 1269141 | 4/1972 | (GB) . | |
| 1789801 | * 1/1993 | (SU) | ...................................... 60/487 |

* cited by examiner

Primary Examiner—Eric Culbreth
(74) Attorney, Agent, or Firm—MacMillan, Sobanski & Todd, LLC

(57) ABSTRACT

A system operated by what is referred to as a clutch pedal, which adjusts the traction power of an infinitely variable, hydrostatic-mechanical transmission. The transmission contains at least one pump (1) and at least one motor (2), arranged in a hydraulic circuit. In order to reduce the traction power, pressure is leaked between the two sides of the motor (2) by reducing the pressure at the control parts (14a) of two proportional valves (14, 15) in respective lines bridging the motor (2). The control parts (14a) of the proportional valves (14, 15) are connected via a shift valve (19) to an intermediate valve (24), the closing force of which is reduced as the clutch pedal (26) is opened by means of a closing spring (36).

10 Claims, 2 Drawing Sheets

SYSTEM FOR CONTROLLING THE TRACTION POWER OF A UTILITY VEHICLE

BACKGROUND OF THE INVENTION

The invention relates to a system for controlling the traction power of a utility vehicle having an infinitely variable transmission. It is particularly suited to a vehicle with an infinitely variable transmission in which power is split between hydrostatic and mechanical branches.

Vehicles which lave an infinitely variable, hydrostatic-mechanical transmission can be accelerated from standstill to a maximum speed in both directions of travel by adjusting the transmission and therefore do not require a conventional clutch between the transmission and the engine. However, in certain situations, e.g. for changing the speed of an additional mechanical transmission offering several speed ranges, it is necessary to reduce the traction power built up at a specific speed without at the same time reducing the speed. A device which meets this requirement is described in DE 195 23 963 A1. So that the operator controls of this vehicle and their layout as well as the vehicle's response to their use conform as far as possible to that of a utility vehicle with a conventional gear shift system, the traction power is controlled by a pedal, which, because of the way it operates, will be referred to as a clutch pedal hereafter. Depending on the degree to which the clutch pedal is opened, orifice plates associated with respective directions of travel and controlled by the clutch pedal each affect the closing power of a valve, the latter being arranged one after the other in a hydraulic line extending between the two sides of the hydraulic motor forming part of the hydrostatic branch of the transmission. Operating the clutch pedal causes the valves to open in proportion thereto, which leaks pressure to a greater or lesser degree between the two sides of the motor. This causes a reduction in the available traction power in proportion to the reduction in pressure. Pressure will be leaked in different directions according to whether the motor is operating in forward or reverse modes.

In a high-power utility vehicle, the known control device has lived up to the expectations placed on it. However, when it comes to substantially lower-power vehicles, it tends to lack sensitivity in attenuating the transmitted traction power in the lower power range. This inadequate sensitivity causes a perceptibly rough driving behaviour during "meshing", making it more difficult to carry out front loading work, for example.

One objective of the invention is to provide a device of the type outlined above, which will permit the transmitted traction power to be sensitively proportioned irrespective of the vehicle drive output.

SUMMARY OF THE INVENTION

According to the invention, a system for controlling the traction power of a utility vehicle comprises:
(a) an operator-actuated control member;
(b) an indefinitely variable transmission;
(c) the said infinitely variable transmission comprising a pump and a motor in a hydraulic circuit arranged such that the motor may be driven in either of two directions;
(d) the said circuit including two main proportional valves arranged to leak hydraulic pressure between the two sides of the motor;
(e) the degree of opening of the said main proportional valves being controlled by the said operator-actuated control member;

characterised in that:
(f) each said main proportional valve is located in a respective hydraulic line bridging the two sides of the motor and is arranged to leak hydraulic pressure in a respective direction between the two sides of the motor.

It has been found that the use of separate lines bridging the motor provides greatly increased sensitivity in the control of the pressure drop across the motor, and thus the control of available power.

Preferably, the opening of each of the main proportional valves is controlled via a respective hydraulic control port, the hydraulic pressure at each said port being controlled by an intermediate proportional valve, the said intermediate valve being resiliently biased into the closed position, with the closing bias force decreasing as the operator actuated control member is operated so as to open the said intermediate valve.

The use of a further valve of this type has been found to further increase the sensitivity of the system. This is because at any given open position of the clutch pedal there will be a specific, precisely set closing force on the intermediate valve, which in turn means that the valve will respond sensitively to changes in the position of the clutch pedal.

Because this type of intermediate valve is quite costly, it is preferred to use only one such valve connected to the control ports of both the main proportional valves. In this case, the intermediate valve is connected to the control ports via automatic selector valve means which automatically connect the port of one of the said main proportional valves to the intermediate valve and disconnect the other of the two main proportional valves from the intermediate valve or vice versa, according to the direction in which hydraulic pressure is to be leaked.

Such automatic selector valve means can be readily provided, for example by a "shift valve" essentially comprising two one-way valves back to back. The two lines to the control ports of the main valves are in this case connected to the two inputs of the shift valve and the output of the shift valve connected to the intermediate valve. Flow will occur to the output of the shift valve from whichever of the inputs is at the higher pressure.

An additional advantage of using only one intermediate valve, together with the automatic selector valve means, is that the overall reaction speed for the system is further increased over the prior art discussed above, with consequent increase in sensitivity of the system.

It is of practical use if the resilient closing bias is provided by a resilient closing member, normally a compression spring, which bears on a valve control member, the control member in turn being acted upon by a resilient return member whose return force increases as the valve is opened This arrangement is therefore preferred.

A spring with a relatively flat characteristic curve may be used for the resilient closing member, which insures a very sensitive response. Preferably, the said valve control member is provided by the piston of a hydraulic slave cylinder connected (via a hydraulic line) to a master cylinder actuated by the operator-actuated control member.

Advantageously, the main proportional valves are connected directly across the two sides of the motor without the interposition of other hydraulic components. The result is that the pressure drop between the two sides of the motor is minimized when the clutch pedal is fully depressed, and may be arranged to be substantially zero. This arrangement is therefore preferred.

Further preferable features are set out in the dependent claims and others will be apparent from the following

DETAILED DESCRIPTION

Figure 1:
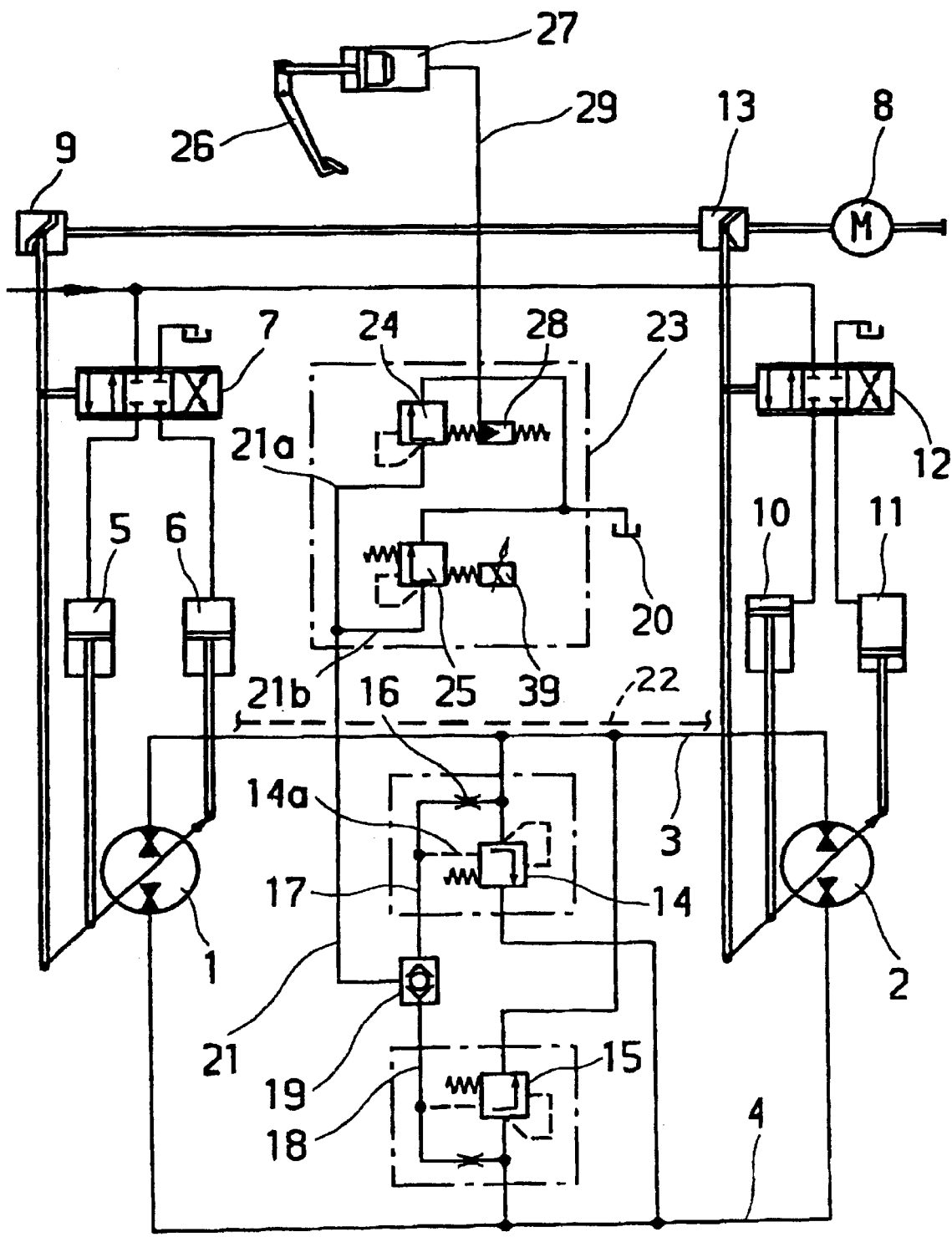
FIG. 1 is a diagram showing the hydraulic layout of a system according to the invention.

In FIG. 1, reference 1 denotes an adjustable primary unit, (a pump) of a hydrostatic-mechanical infinitely variable transmission driven by a combustion engine which is not depicted. Together with a secondary unit (motor) 2, also adjustable, and a hydraulic motor, the pump 1 is arranged in a hydraulic circuit connecting respective sides of the pump and motor. When the motor is turning in one direction, corresponding to forward direction of travel of the vehicle, the upper line 3 in FIG. 1 will carry hydraulic fluid at a positive pressure whilst the lower line 4 will carry hydraulic fluid at a negative pressure. For the opposite direction of rotation of the motor, corresponding to a reverse direction of travel of the vehicle, this will be reversed. It will be assumed in the description below that the upper line 3 in the drawing conveys hydraulic fluid at positive pressure, corresponding to forward travel, but it will be appreciated that the direction of flow could be reversed and the system would work in essentially the same way.

The pump 1 is adjusted in a known manner by two adjusting cylinders 5, 6 to which pressure is applied via a valve 7. This is controlled by means of a cam 9 driven by a motor 8 which is controlled by the vehicle operator Similarly, two adjusting cylinders 10, 11, a valve 12 and an operating cam 13 driven by the motor 8 are used to adjust the motor 2.

In order to be able to reduce the traction power temporarily in a manner similar to that which occurs with utility vehicles that have conventional gear shift systems with a clutch, two main proportional valves 14, 15 are arranged between the positive pressure line 3 and the negative pressure line 4. Valve 14 is situated in a first bridging line extending between lines 3 and 4, with its input connected to line 3. Valve 15 is identical to valve 14 but is connected in a separate line bridging the lines 3 and 4, with its input connected to line 4. Both valves 14 and 15 are connected directly across the motor, with no intervening components other tan hydraulic lines.

In this description, since the forward travel mode is being described, reference only will be made to main valve 14, but it may be inferred that reverse travel will function in exactly the same way but with the positive and negative pressure reversed between lines 3 and 4 and with valve 15 functioning instead of valve 14.

Figure 2:
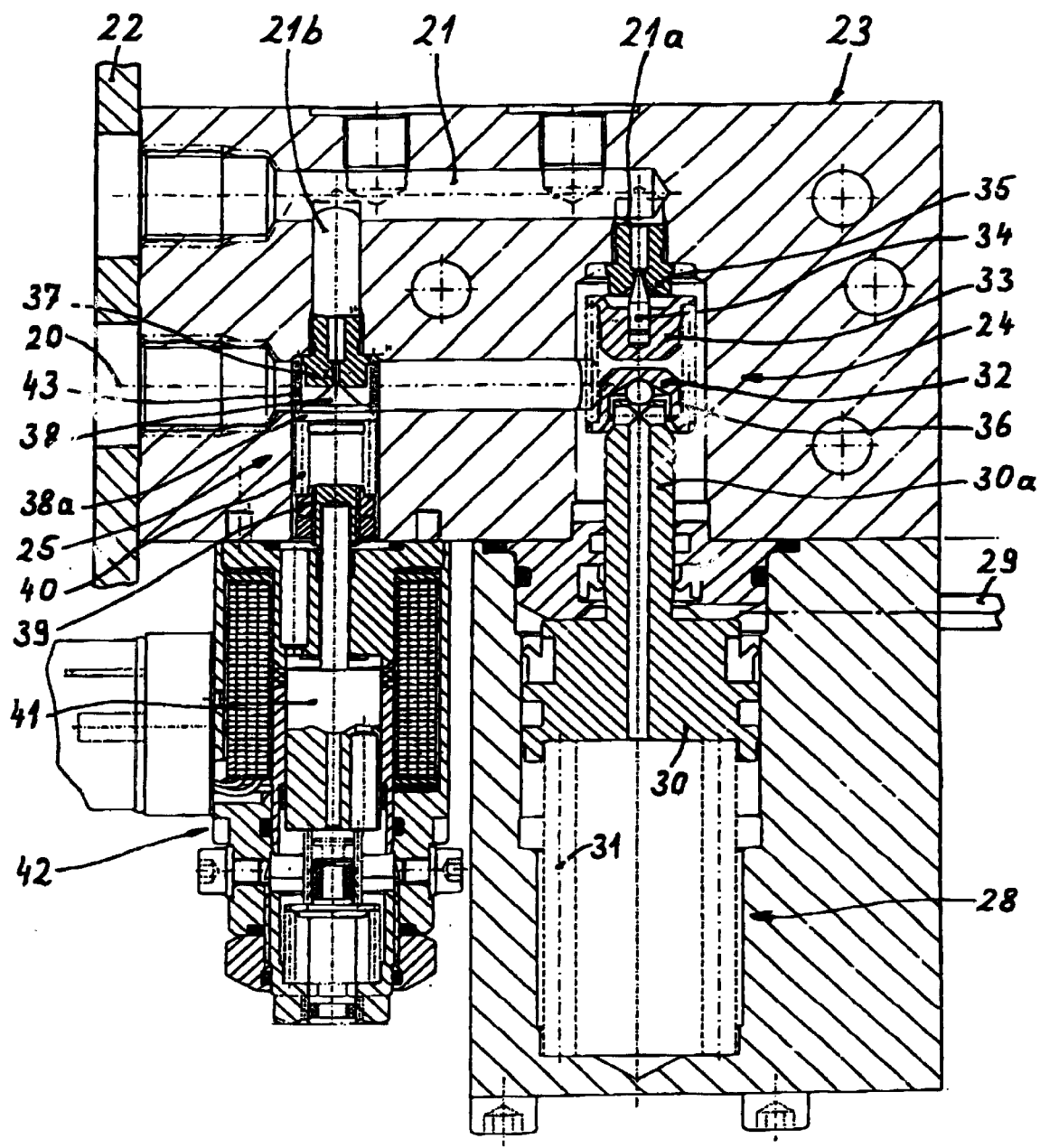
FIG. 2 is a sectional view of a unit housing two intermediate proportional valves in the system of FIG. 1.

Main valve 14 is designed so that it remains closed under its own closing pressure, which is produced by an adjustable spring and pressure in the line 3 transmitted via an orifice 16 to the control inlet 14a. Running off from this control inlet as well as from that of the valve 15 are hydraulic lines 17, 18, which are connected to the two inlets of a shift valve 19. A hydraulic line 21 running from the outlet of the shift valve 19 leads to a valve unit 23 arranged outside the gear housing 22 (see FIG. 2) in which the hydrostatic-mechanical transmission is housed. The valve unit 23 contains two intermediate proportional valves 24, 25 connected at their inputs via branch lines 21a, 21b to the hydraulic line 21.

The intermediate valve 24 is controlled by means of a foot-operated pedal which, because the effect it produces in terms of interrupting the power flow when operated is similar to that of a clutch, will be referred to as clutch pedal 26. The pedal 26 acts on a master cylinder 27 which is linked to a slave cylinder 28 (see FIG. 2) via a hydraulic line 29. The cylinder 28 includes a control member or piston 30 and a return spring 31 which generates a force to reset the clutch pedal 26 in proportion to the degree to whir, the clutch pedal 26 is opened. The piston 3b, the stroke of which corresponds to a full operation of the clutch pedal 26, has a stop 32 mounted at the free end of a projection 30a. Located between this stop 32 and another stop 33, which in turns bears on a valve needle 34 lying in a valve seat 35, is a closing spring 36 which determines the closing force of the pressure limiting valve 24. The farther the clutch pedal 26 is opened, the farther the piston 30 with stop 32 is moved back from the valve seat 35, as a result of which the biasing force of the closing spring 36 decreases and the closing force is reduced. The closing force can be adjusted to a very high degree of sensitivity because of the large stroke of the piston 30 as compared with the opening stroke of the valve cone 34, The position of the valve needle 34 is set directly according to the closing force of the spring 36 and the pressure of the hydraulic fluid; unpredictable forces on the piston 30 due to friction in the cylinder 28 are not passed on to the needle 34.

The purpose of the intermediate valve 25 is to produce the effect of a turbo-coupling in a conventional drive train. It has a valve seat 37 with which a valve cone 38 co-operates. The closing force is controlled by a pre-loaded closing spring 40 arranged between a collar 38a on the cone 38 and a stop 39 connected to the core 41 of an electromagnet 42. The electromagnet 42 is controlled by the vehicle electronics. In order to support the electromagnet 42 when the valve is being opened, a compression spring 43 pre-loaded to a slightly lesser degree than closing spring 40 is provided, arranged between the valve seat 37 and the collar 38a.

The operation of the control system will now be described.

Under normal driving conditions, the swashplates of the pump 1 and the motor 2 are adjusted by the adjusting cylinders 5, 6, 10, 11 depending on the selected direction of travel: the clutch pedal is not operated. The two intermediate valves 24, 25 in the valve unit 23 keep the hydraulic medium line 21 closed so that the full closing pressure builds up at the control inlet of the main valve 14 connected to the positive pressure line 3. The main valve 14 is thus closed and there is no leakage of pressure between the lines 3 and 4.

Immediately after the clutch pedal 26 is operated, hydraulic fluid flows out from the master cylinder 27 into the slave cylinder 28 and displaces the piston 30 to an extent governed by the degree to which he clutch pedal 26 is opened. The valve seat 35 opens proportionately thereto and allows a small quantity of hydraulic fluid to flow out from the positive pressure line 3 via the, orifice 16, the shift valve 19 and the hydraulic line 21 to the sump 20. The out flowing hydraulic fluid causes a drop in pressure at the orifice 16, as a result of which a larger quantity of hydraulic flows from the line 3 to the negative pressure line 4, as the closing pressure acting on the main valve 14 decreases. This process results in a reduction in the pressure drop between lines 3 and 4, which in turn reduces the output torque of the pump 2, i.e. the traction power of the of the drive, to the required degree. This process continues the farther the clutch pedal 26 is opened until the pressure drop between lines 3 and 4 falls so much that the traction power falls to zero.

In the prior art discussed above, the equivalents to valves 14 and 15 are arranged in a single bridging line extending between the two sides of the motor. It is believed that the resistance caused by the fluid having to flow through two valves firstly increases the overall response time of the system and secondly causes a substantial pressure drop across the motor even when the "clutch" is fully depressed, giving rise to the possibility that the vehicle will creep forward even when the "clutch" is supposedly "fully disengaged".

Although the exact reasons are not entirely understood, it has been found that the use of separate bridging lines gives rise to more sensitive and precise control from the clutch pedal, and the decreased system response time and decreased pressure drop across the motor when the clutch pedal 26 is fully depressed may well contribute to This improved control.

The way in which the control device operates when controlled by the electromagnet 42 differs only slightly from the control system as applied by the clutch pedal 26 described above. If the presence of a turbo-coupling connected downstream of the motor 8 in the power train is to be simulated, the electromagnet 42 is excited by the vehicle electronics and the core 41 is pulled down. The closing fore produced by the closing spring 40 is reduced as a function of the displacement of the core 41 and the opening spring 43 acts on the valve core 38 so as to open it. Hydraulic fluid can thus flow out from the hydraulic line 21 into the sump 20. This operating mode is otherwise no different from the operation described above with the clutch pedal 26.

What is claimed is:

1. A system for controlling the traction power of a utility vehicle, the system comprising:
    (a) an operator-actuated control member;
    (b) an infinitely variable transmission;
    (c) the said infinitely variable transmission comprising a pump and a motor in a hydraulic circuit arranged such that the motor may be driven in either of two directions, said motor having two sides;
    (d) the said circuit including two main proportional valves arranged to leak hydraulic pressure between the two sides of the motor;
    (e) the degree of opening of the said main proportional valves being controlled by the said operator-actuated control member;
wherein:
    (f) each said main proportional valve is located in a respective hydraulic line bridging the two sides of the motor and is arranged to leak hydraulic pressure in a respective direction between the two sides of the motor.

2. A system as claimed in claim 1 wherein the opening of each of the main proportional valves is controlled via a respective hydraulic control port, the hydraulic pressure at each said port being controlled by an intermediate proportional valve, wherein the said intermediate valve is resiliently biased into the closed position and the closing bias force decreases as the operator-actuated control member is operated so as to open the said intermediate valve.

3. A system as claimed in claim 2, wherein the said intermediate proportional valve is connected to the said control ports of the said main proportional valves via an automatic selector valve which automatically connects the port of one of the said main proportional valves to the intermediate valve and disconnects the other of the two main proportional valves from the intermediate valve or vice versa, according to the direction in which hydraulic pressure is to be leaked.

4. A system as claimed in claim 3, wherein the said main proportional valves and the said automatic selector valve is located in a casing housing the pump and motor.

5. A system as claimed in claim 2 wherein the said resilient closing bias of the intermediate valve is provided by a resilient closing member which bears on a valve control member, the control member in turn being acted upon by a resilient return member whose return force increases as the valve is opened.

6. A system as claimed in claim 5 wherein the said valve control member is provided by a piston of a hydraulic slave cylinder connected to a master cylinder actuated by the operator-actuated control member.

7. A system as claimed in claim 6, wherein the said main proportional valves are each connected directly across the two sides of the motor without the interposition of other hydraulic components.

8. A system as claimed in claim 2, wherein the control ports of the main proportional valves are connected to a second intermediate proportional valve having a further resilient closing member bearing on a control member whose position is adjustable by means of a solenoid.

9. A system for controlling the traction power of a utility vehicle, the system comprising:
    (a) an operator-actuated control number;
    (b) an infinitely variable transmission;
    (c) the said infinitely variable transmission comprising a pump and a motor in a hydraulic circuit arranged such that the motor may be driven in either of two directions, said motor having two sides;
    (d) the said circuit including two main proportional valves arranged to leak hydraulic pressure between the two sides of the motor;
    (e) the degree of opening of the said main proportional valves being controlled by the said operator-actuated control member;
wherein:
    (f) each said main proportional valve is located in a respective hydraulic line bridging the two sides of the motor and is arranged to leak hydraulic pressure in a respective direction between the two sides of the motor;
        wherein the opening of each of the main proportional valves is controlled via a respective hydraulic control port, the hydraulic pressure at each said port being controlled by an intermediate proportional valve, wherein the said intermediate valve is resiliently biased into the closed position and that the closing bias force decreases as the operator-actuated control member is operated so as to open the said intermediate valve and wherein the said resilient closing of the intermediate valve is provided by a resilient closing member which bears on a valve control member, the control member in turn being acted upon by a resilient return member whose return force increases as the valve is opened;
        wherein the said valve control member is provided by a piston of a hydraulic slave cylinder connected to a master cylinder actuated by the operator-actuated control member;
        wherein the control ports of the main proportional valves are connected to a second intermediate proportional valve having a further resilient closing member bearing on a control member whose position is adjustable by means of a solenoid.

10. A system as claimed in claim 9, wherein the said intermediate proportional valve is connected to the said control ports of the said main proportional valves via an automatic selector valve which automatically connects the port of one of the said main proportional valves to the intermediate valve and disconnects the other of the two main proportional valves from the intermediate valve or vice versa, according to the direction in which hydraulic pressure is to be leaked.

* * * * *